United States Patent Office
3,655,758
Patented Apr. 11, 1972

3,655,758
IMINOCARBONYL DERIVATIVES
George A. Kurhajec, North Oaks, and Erwin W. Neuvar, White Bear Lake, Minn., assignors to Minnesota Mining and Manufacturing Company, St. Paul, Minn.
No Drawing. Filed Oct. 10, 1966, Ser. No. 587,369
Int. Cl. C07c 131/00
U.S. Cl. 260—566 AE    6 Claims This invention relates to derivatives of hydroxyiminocarbonyl chloride and to processes for their preparation, and more particularly to alkoxyiminocarbonyl compounds and to a process for their preparation.

Few alkoxyiminocarbonyl chloride derivatives were heretofore known to the art. So far as applicants are aware, such compounds having energetic groups as substituents have not been previously disclosed.

This invention contemplates the provision of a process for making new and useful alkoxyiminocarbonyl group-containing compounds, and new and useful compounds produced by the process. Other objects of the invention will be apparent from the following disclosure.

The new compounds of the invention are O-(substituted)-alkoxyiminocarbonyl compounds having the general formula

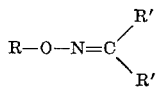

wherein R is alkyl, haloalkyl, fluoroalkyl or fluoramino-substituted polyfluoroalkyl, having from 1 to 12 carbon atoms; and R' is chlorine, bromine, fluorine, —NF$_2$, —NH$_2$, —NHR", —N(R")$_2$ or —OR", wherein R" is a lower alkyl radical.

The carbon chains of the alkyl groups contained in the said compounds can be either straight or branched type, and they can be substituted by cyano or aldehyde groups. Haloalkyl includes chloro- and bromo-alkyl; when chlorine is present as a substituent in the chloroalkyl radicals, from 1 to 4 chlorine atoms can be present, depending on the chain length; likewise from 1 to 4 bromine atoms, or both chlorine and bromine atoms can be present. "Fluoroalkyl" includes alkyl groups having one or more fluorine atoms, including perfluoroalkyl groups. "Polyfluoroalkyl" includes perfluoroalkyl and substantially perfluorinated alkyl, e.g. having 1 or 2 hydrogens. Fluoramino-substituted polyfluoroalkyl contains fluorimino, difluoramino or monofluoramino substituents, from 1 to 4 or even more of such groups being present, depending on the carbon chain length. "Lower alkyl" means alkyl from 1 to 5 carbon atoms.

An especially preferred embodiment of this invention encompasses O-(substituted)alkoxyiminocarbonyl compounds having the general formula, as above defined, in which R represents a tris(difluoramino)methyl radical and each R' represents a chlorine atom.

The invention also comprehends within its scope a process for the production of a compound of the formula

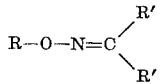

wherein R is alkyl, haloalkyl containing from 1 to 4 chlorine or bromine atoms, fluoroalkyl or fluoramino-substituted polyfluoroalkyl, said alkyl or substituted alkyl radicals having from 1 to 12 carbon atoms in a straight or branched chain; and R' is chlorine, bromine, fluorine, —NF$_2$, —NH$_2$, —NHR", —N(R")$_2$ or —OR", wherein R" is a lower alkyl radical; which comprises reacting a hydroxyiminocarbonyl halide with a compound containing at least one carbon-carbon or carbon-nitrogen double bond, and capable of reacting by nucleophilic addition to said hydroxyiminocarbonyl halide, to produce a substituted iminocarbonyl halide of the formula

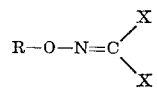

wherein X is chlorine or bromine; and reacting said substituted iminocarbonyl halide with fluorine or a compound of the group consisting of R"OH, R"NH$_2$, (R")$_2$NH, NH$_3$ or R"OMe, wherein R and R" have the above-designated significance, and Me is an alcoholate-forming metal.

Broadly speaking, the O-alkoxyiminocarbonyl compounds of the invention are prepared in two steps. In the first step, the double bond-containing starting material is reacted with hydroxyiminocarbonyl halide, thereby obtaining the corresponding O-alkoxyiminocarbonyl halide. In the second step, the O-alkoxyiminocarbonyl halide is fluorinated, or the halogen atoms directly attached to the iminocarbonyl group are replaced with an R' group other than fluorine.

In carrying out the process, the selected double bond-containing starting material and e.g. hydroxyiminocarbonyl chloride are mixed in a reactor, advantageously but not necessarily in the presence of an appropriate inert solvent, with a catalytic amount of a basic substance. Where the starting material is gaseous, the reaction may take place with gaseous compound passed into dissolved hydroxyiminocarbonyl chloride, or with both reactants in dissolved state, to obtain the nucleophilic adduct or condensation product.

The inert solvent medium for this condensation reaction can be any one of a number of solvents, such as, for example, acetonitrile, trifluoroethanol, nitromethane, ethyl acetate, methylformate, sulfolane, dimethyl ether and polyethers.

A basic catalyst can be employed in the reaction. The particular basic catalyst employed to facilitate the condensation, e.g. of a perfluoroimine or other unsaturated compound with the hydroxyiminocarbonyl chloride may be any one of a number of basic substance, such as, for example, urea, N,N'-dimethyl urea, triethylamine and the like, provided that such catalysts do not cause the decomposition of the hydroxyiminocarbonyl chloride or of the O-(substituted)alkoxyiminocarbonyl chloride. Representative basic catalysts which may be employed are urea, dimethyl urea, tetramethyl urea, cyanide ion, triethylamine and the like. The amounts used are from 1 to 15 mol percent.

The temperature employed in carrying out the nucleophilic addition reaction primarily depends on the reactivity of hydroxyiminocarbonyl chloride with the unsaturated starting material and the stability of the resulting O-(substituted)alkoxyiminocarbonyl chloride. A temperature range of from about —200° to about 100° C. can be employed; and the range of from about —120° to about 30° C. is preferred.

The second step of the synthesis when fluorination, e.g. of the NFH group of an O-(monofluoramino)alkoxyminocarbonyl chloride, is undertaken, is readily accomplished with elemental fluorine in the presence of an appropriate solvent. The fluorination process may be conducted by contact of elemental fluorine with a stationary or agitated bed of the monofluoramino compound, but it is preferred to pass fluorine through a solution or suspension of the monofluoramino compound. This fluorination reaction may be conducted at pressures greater than one atmosphere, but it is preferred to operate at atmospheric pressure using a flow-through system.

In the preferred procedure, elemental fluorine is introduced as a gas, either in a relatively pure form or in a preferred diluted form, premixed with an inert gaseous diluent such as nitrogen or helium. Very low concentrations of fluorine, as low as about 10 volume percent diluted with nitrogen, are most preferred. The particular solvent medium for the fluorination reaction may be any one of a number of solvents, such as, for example, trichlorofluoromethane, perfluorooctane, perfluorocyclobutane, perfluorotributylamine, acetonitrile, trifluoroethanol, nitromethane, benzene and the like.

The reaction of fluorine with the monofluoramino compound or other hydrogenated intermediates may be carried out at temperatuers of about $-100°$ to $+100°$ C., with a preferred temperature range of from about $-50°$ to $+10°$ C., and an especially preferred temperature range of from $-35°$ to $-20°$ C.

For illustrative purposes, the preparation of O-tris-(difluoramino)methoxyiminocarbonyl chloride may be shown by the following reaction scheme:

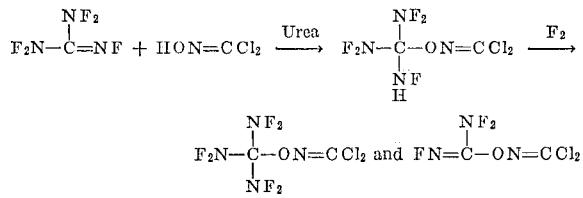

The above reaction may be looked upon as a nucleophilic addition of hydroxyiminocarbonyl chloride to perfluoroguanidine to give O-di(difluoramino)(monofluoramino)-methoxyiminocarbonyl chloride. The monofluoramino compound is then reacted with fluorine to give O-tris(difluoramino)methoxyiminocarbonyl chloride. The formation of fluorimino-fluoramino methoxyiminocarbonyl chloride occurs by elimination of difluoramine ($HNF_2$) in the course of the reaction. Replacement of the chlorine atoms on the carbonyl group can also take place.

In conducting the process of the invention, the relative proportions of the reactants can be varied. It is preferred to employ a slight excess of unsaturated starting material over the hydroxyiminocarbonyl chloride in order to insure a complete reaction. Also, it may be advantageous to employ an excess of fluorine or other reactant over the methoxy-substituted iminocarbonyl halide in the second step, to insure a complete reaction.

Hydroxyiminocarbonyl halide reacts by nucleophilic addition to other compounds. Representative compounds which take part in such nucleophilic addition and which can be employed in the process of this invention include, for example, perfluoromethyleneimine, perfluoroformamidine, perfluoroguanidine, perfluoro-1-azapropene, n-perfluoro - 2 - aza-butene-2, perfluoro-1-aza-2-methylpropene, perfluoroethylene, perfluoropropylene, perfluoroisobutylene, chlorotrifluoroethylene, perfluorobutene - 1, perfluoroacrylonitrile, acrylonitrile, acrolein, methacrolein and the like. Alternatively, the hydroxyiminocarbonyl starting material can be substituted prior to condensation with the fluorimino compound.

Hydroxyiminocarbonyl compounds which can be employed in the process are exemplified by hydroxyiminocarbonyl chloride, hydroxyiminocarbonyl bromide, hydroxyiminocarbonyl fluoride, hydroxyiminoguanidine, hydroxyiminotetramethylguanidine, hydroxyiminodimethylcarbonate and the like.

Representative solvents which may be employed include the perfluoro compounds such as perfluorooctane, perfluorocyclobutane, perfluorotributylamine and the like; fluorochloro compounds such as trichlorofluoromethane and the like; and polar solvents such as acetonitrile, trifluoroethanol, nitromethane, ethylacetate, methylformate, sulfolane and the like.

We have discovered as noted above that the carbonyl halide atoms of the substituted iminocarbonyl halide, e.g. O-tris(difluoramino)methoxyiminocarbonyl chloride, can be selectively replaced by other radicals leading to other compounds of the invention. Thus, O-tris(difluoramino) methoxyiminocarbonyl chloride can be treated with sodium alkoxide to form dimethylcarbonate derivatives, e.g.:

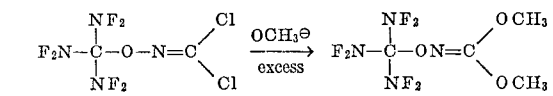

Likewise, amines or substituted amines can be reacted with the tris(difluoramino)methoxyiminocarbonyl chloride thus:

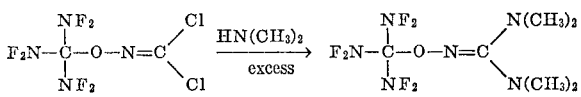

The reaction can be carried out at a temperature in the range of about $-120°$ to $+120°$ C. When energetic groups are present in the starting or final products, lower temperatures, e.g. below about $-25°$ C. and precautions against overheating are used. The usual precautions for handling energetic or explosive materials must of course also be observed.

The novel O-(substituted)alkoxyiminocarbonyl chloride derivatives find important utility in the field of chemical intermediates. More specifically, they are useful as chemical intermediates in the preparation of chemical oxidants wherein the substituted alkoxy radicals contain the high energy difluoramino moiety. They are especially useful as chemical intermediates in the preparation of rocket propellants or explosives when the substituted alkoxy radical contains three difluoramino radicals. The novel O-(substituted)alkoxyiminocarbonyl chlorides are of primary importance when they are converted to other compounds of the invention of much higher energy. For example, the reaction of the O-(substituted)alkoxyiminocarbonyl chloride with amines permits the resulting amino group-containing derivatives to be converted into perchlorate salts. Another reaction of importance is the reaction of the novel O-(fluoramino substituted)alkoxyiminocarbonyl chloride with polyfunctional compounds, thereby preparing polymers containing high energy oxidizing groups, and useful as polymers in propellant ingredients.

The compounds of the invention containing halogen attached to the carbonylimino group can be used for crosslinking of polymers, e.g. polyols; those with amino groups in this position are curing agents for epoxy resin prepolymers. Compounds wherein R is alkyl, haloalkyl or fluoroalkyl and R' is alkoxy may be used for their surfactant properties.

The fluorinated compounds of the invention, when they contain strongly oxidizing groups, are useful as oxidizers in explosive and liquid and solid propellant compositions. These can be ignited as by means of a squib or exploded with a cartridge. Such propellant compositions, optionally with an additional oxidizer such as ammonium perchlorate to consume any carbon present, such as that in any organic binder used, burn with intense heat and the formation of large volumes of gases.

The compounds of the invention and the process for their preparation are more specifically illustrated by the following specific examples, in which all parts are by weight unless otherwise specified. It is to be understood that the examples are merely illustrative of the best mode presently contemplated for the practice of the invention and are not to be regarded as limiting, since the basic teachings herein may be varied at will, as will be understood by one skilled in the art to which this invention pertains.

EXAMPLE 1

Preparation of O-di(difluoramino)(monofluoramino) methoxyiminocarbonyl chloride

Into a 10 ml. reactor, equipped with a Fisher-Porter valve and a Teflon-covered magnetic stirring bar there were placed 0.522 g. (4.58 mmoles) of hydroxyiminocarbonyl chloride, 0.028 g. of urea and about 4 ml. of dry acetonitrile. The mixture was cooled to $-196°$ C., degassed, and then permitted to warm to −111° C. Perfluoroguanidine (0.75 g., 5.1 mmoles) was then condensed into the reactor. The reaction mixture was warmed slowly to room temperature and stirred for two hours. Fluorine-19 n.m.r. analysis of the reaction mixture showed almost complete conversion to the O-di(difluoramino)(monofluoramino)methoxyiminocarbonyl chloride, with a strong singlet at −23.4φ (NF$_2$) and a multiplet at +137.5φ (NFH). (Trichlorofluoromethane was used as reference.) This product is isolated by gas-liquid chromatography.

EXAMPLE 2

Preparation of O-tris(difluoramino)methoxyiminocarbonyl chloride

Fluorination of the O-di(difluoramino)(monofluoramino)methoxyiminocarbonyl chloride was performed by bubbling 37 mmoles of 10 percent fluorine, diluted with nitrogen, through a stirred acetonitrile solution of the said material at about −30° C. The flow rate of the 10 percent fluorine was about 35 cc./min. The O-tris(difluoramino)methoxyiminocarbonyl chloride was obtained in high purity by gas-liquid chromatography, using a 12 foot ⅜ inch column of FS-1265 (a fluorosilicone fluid, available commercially from the Dow-Corning Company) on Anakrom ABS (diatomaceous earth, acid and base washed and silanized, available commercially from the Analab Company) (30 percent) at a temperature of 70° C. with a flow rate of helium carrier gas of 200 cc./min. The O-tris(difluoramino)methoxyiminocarbonyl chloride was obtained in about 35 percent yield as a colorless liquid with a vapor pressure of about 5 mm. of mercury at room temperature and showed a strong fluorine-19 n.m.r. singlet at −25.2φ (NF$_2$). (Trichlorofluoromethane was used as reference.)

*Analysis.*—Calculated for C$_2$N$_4$OCl$_2$F$_6$ (percent): C, 8.6; N, 19.9; Cl, 25.2; F, 40.6 (MW, 281). Found (percent): C, 9.6; N, 19.9; Cl, 24.9; F, 41.4 (MW, 270±13 by effusion rate in a mass spectrometer).

Another product of the reaction isolated during the gas-liquid chromatography step was fluorimino-difluoraminomethoxyiminocarbonyl chloride. This product was identified by its infrared spectrum, molecular weight by effusion on a mass spectrometer, and fragmentation pattern on the mass spectrometer.

EXAMPLE 3

0.2838 g. (1.0 mmole) of O-tris(difluoroamino)methoxyiminocarbonyl chloride was dissolved in trichlorofluoromethane, to which was added an excess of sodium methoxide (0.1397 g., 2.6 mmoles), containing some methanol, and then the resulting mixture was stirred for six hours at about 25° C. The sodium chloride and other insolubles were filtered away. From the filtrate, the trichlorofluoromethane was removed by evaporation, and substantially pure O-tris(difluoramino)methoxyiminodimethyl carbonate was obtained, a colorless liquid, with a vapor pressure of less than 1 mm. at room temperature.

EXAMPLE 4

To a solution of 0.4898 g. of O-tris(difluoramino)-methoxyiminocarbonyl chloride in 3 ml. of trichlorofluoromethane was added an excess of dimethylamine (6.6 mmoles), and then the resulting mixture was stirred for 2½ hours, at about 25° C. The dimethylaminehydrochloride and other insolubles were filtered away. From the filtrate, the trichlorofluoromethane was removed by evaporation, and substantially pure O-tris(difluoramino) methoxyiminotetramethylguanidine was obtained, as a viscous liquid, with a vapor pressure of less than 1 mm. at room temperature.

Further examples of the process and products of the invention are presented in tabular form below. The process steps and methods for isolation of the products are basically the same as those of Examples 1 and 4; and solvents and catalytic amounts of base, when used, are noted. Reactant A is the iminocarbonyl reactant; Reactant B is the compound to which A adds nucleophilically, or the compound which reacts with the halogen atoms of the substituted iminocarbonyl halide.

TABLE I

| Example No. | Reactants A | Reactants B | Solvent/catalyst | Product |
|---|---|---|---|---|
| 5 | HON=CCl$_2$ | CH$_2$=CH—CN | Diglyme/pyridine | NCCH$_2$CH$_2$ON=CCl$_2$ |
| 6 | HON=CCl$_2$ | CH$_2$=CH—CHO | ...do... | $\underset{\text{H}}{\overset{\text{O}}{\text{C}}}$CH$_2$CH$_2$ON=CCl$_2$ |
| 7 | HON=CBr$_2$ | CH$_3$CH=CH—CHO | ...do... | $\underset{\text{H}}{\overset{\text{O}}{\text{C}}}$CH$_2$$\underset{\text{CH}_3}{\text{CH}}$ON=CBr$_2$ |
| 8 | HON=CCl$_2$ | CF$_2$=CF$_2$ | Pyridine | HCF$_2$—CF$_2$ON=CCl$_2$ |
| 9 | HON=CCl$_2$ | CF$_3$CF=CF$_2$ | ...do... | CF$_3$CFH—CF$_2$ON=CCl$_2$ |
| 10 | HON=CCl$_2$ | CF$_3$C(CF$_3$)=CF$_2$ | No solvent or catalyst | CF$_3$$\underset{\text{CF}_3}{\text{CH}}$—CF$_2$ON=CCl$_2$ |
| 11 | HON=CCl$_2$ | CF$_2$=CFCN | ...do... | NC—CFHCF$_2$ON=CCl$_2$ and CHF$_2$CF(CN)—ON=CCl$_2$ |
| 12 | HON=CCl$_2$ | Diazomethane | Diethyl ether | CH$_3$ON=CCl$_2$ |
| 13 | HON=CCl$_2$ | CCl$_2$=CH$_2$ | Diethyl ether/pyridine | CH$_3$—CCl$_2$—ON=CCl$_2$ |
| 14 | HON=CCl$_2$ | CClBr=CH$_2$ | ...do... | CH$_3$—CClBr—ON=CCl$_2$ |
| 15 | HON=CCl$_2$ | 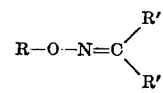 | Carbon tetrachloride/ultraviolet light. | HCF$_2$ON=CCl$_2$ |
| 16 | CF$_3$CFHCF$_2$ON=CCl$_2$ | LiNH$_2$ | Trichlorofluoromethane | CF$_3$CFHCF$_2$ON=C(NH$_2$)$_2$ and CF$_3$CF=CF—ON=C(NH$_2$)$_2$ |
| 17 | CF$_3$CFHCF$_2$ON=CCl$_2$ | NH$_3$ | ...do... | CF$_3$CFHCF$_2$ON=C(NH$_2$)$_2$ |
| 18 | CF$_3$CFHCF$_2$ON=CCl$_2$ | CH$_3$NH$_2$ | ...do... | CF$_3$CFHCF$_2$ON=C(NHCH$_3$)$_2$ |

What is claimed is:
1. A compound of the formula

$$R-O-N=C\diagup^{R'}_{R'}$$

wherein R is alkyl, haloalkyl containing from 1 to 4 chlorine or bromine atoms, fluoroalkyl or fluoramino-substituted polyfluoroalkyl, said alkyl or substituted alkyl radicals having form 1 to 12 carbon atoms in a straight or branched chain; and R' is chlorine, bromine, flourine, —NF$_2$, —NH$_2$, —NHR'', —N(R'')$_2$ or —OR'', wherein R'' is a lower alkyl radical.

2. O - tris(difluoramino)methoxyiminocarbonyl chloride according to claim 1, having the formula

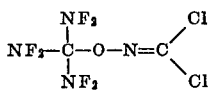

3. O - di(difluoramino)(monofluoramino)methoxyiminocarbonyl chloride according to claim 1, having the formula

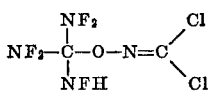

4. Fluorimino - difluoramino - methoxyiminocarbonyl chloride according to claim 1, having the formula

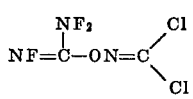

5. O-tris(difluoramino)methoxyiminodimethyl carbonate according to claim 1, having the formula

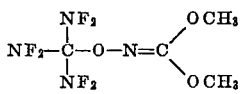

6. O-tris(difluoramino)methoxyiminotetramethyl-guanidine according to claim 1, having the formula

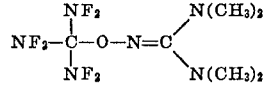

References Cited

Senning, Chem. Reviews, vol. 65, pp. 385 to 388 (1965).

LELAND A. SEBASTIAN, Primary Examiner

U.S. Cl. X.R.

149—76, 109; 260—566 A